United States Patent [19]
Keller et al.

[11] Patent Number: 6,163,821
[45] Date of Patent: Dec. 19, 2000

[54] METHOD AND APPARATUS FOR BALANCING LOAD VS. STORE ACCESS TO A PRIMARY DATA CACHE

[75] Inventors: James B. Keller, Waltham; Richard E. Kessler, Shrewsbury; Stephen C. Root, Westboro; Paul Geoffrey Lowney, Concord, all of Mass.

[73] Assignee: Compaq Computer Corporation, Houston, Tex.

[21] Appl. No.: 09/215,354

[22] Filed: Dec. 18, 1998

[51] Int. Cl.[7] .......................... G06F 13/20; G06F 13/16; G06F 13/362

[52] U.S. Cl. ...................... 710/57; 712/245; 712/248; 712/219; 711/125; 711/132

[58] Field of Search ...................... 712/212, 215, 712/206, 219, 245, 248; 711/118, 125, 132; 710/57

[56] References Cited

U.S. PATENT DOCUMENTS

| | | | |
|---|---|---|---|
| 5,003,463 | 3/1991 | Coyle et al. | 710/57 |
| 5,509,130 | 4/1996 | Trauben et al. | 712/215 |
| 5,621,896 | 4/1997 | Burgess | 711/118 |

*Primary Examiner*—Daniel H. Pan
*Attorney, Agent, or Firm*—Hamilton, Brook, Smith & Reynolds, P.C.

[57] ABSTRACT

A computer method and apparatus causes the load-store instruction grouping in a microprocessor instruction pipeline to be disrupted at appropriate times. The computer method and apparatus employs a memory access member which periodically stalls the issuance of store instructions when there are prior store instructions pending in the store queue. The periodic stalls bias the issue stage to issue load groups and store instruction groups. In the latter case, the store queue is free to update the data cache with the data from previous store instructions. Thus, the invention memory access member biases issuance of store instructions in a manner that prevents the store queue from becoming full, and as such enables the store queue to write to the data cache before the store queue becomes full.

15 Claims, 2 Drawing Sheets

6,163,821

METHOD AND APPARATUS FOR BALANCING LOAD VS. STORE ACCESS TO A PRIMARY DATA CACHE

BACKGROUND OF THE INVENTION

Generally, a computer program is an ordered set or sequence of instructions to be processed, or executed, by a computer processor. The processor fetches the program instructions and executes them. Normally, instructions are fetched sequentially, with breaks in the sequence occurring when a branch or jump instruction is encountered. The order in which the instructions are fetched is the program order.

Many modern microprocessors allow instructions to execute out of order. In particular, instructions are placed in an issue queue in fetch-order. However, they are executed in issue-order. The processor attempts to execute instructions in the original fetched order, but some instructions may be delayed by dependencies resulting in the observed issue-order. Dependencies include register dependencies and memory dependencies. A register dependency results when an instruction requires a register value that is not yet available from a previous instruction. A memory dependency results when an instruction requires a register value that is not yet available from a previous load.

Further, as load and store instructions are issued, the load instructions tend to be processed immediately. On the other hand, each store instruction is either (i) held in a store queue pending a "dump" (i.e., its data being written) to a data cache or (ii) squashed if the store queue is full. The dump can only occur during a data cache cycle, in which there are no load instructions (or some other non-store operations) accessing the data cache.

In many microprocessors, the instructions are issued in an order where the load and store instructions are mixed together in an arbitrary pattern. As a result, there are no cycles or too few cycles in which a dump may occur. Thus, the store queue becomes full and a trap is generated. Ultimately, recovery from such a trap detracts from performance.

The terms load, load instruction and load operation instruction are used herein interchangeably and refer to instructions which cause data to be loaded, or read, from memory. This includes the usual load instructions, as well as move, compare, add, and so on where these instructions require the reading of data from memory or off-chip cache. Similarly, the terms store, store instruction and store operation instruction are used interchangeably and refer to instructions which cause data to be written to memory or off-chip cache.

SUMMARY OF THE INVENTION

The present invention solves the problems of the prior art and in particular minimizes the number of store queue "FULL" traps. This is accomplished by the present invention blocking the issuance of a store instruction(s) in occasional data cache cycles. In a processor with the capability of issuing multiple load and store instructions per data cache cycle, this invention increases the band width of store instructions to the data cache, by reducing the number of data cache cycles "poisoned" by loads.

In the preferred embodiment, the present invention provides a computer method and apparatus that causes the mixing of load and store instructions to be disrupted at appropriate times. Specifically, whenever there are stores pending in the store queue, a memory access member is engaged which inserts a stall every third cycle. This stall prevents the issuance of only store instructions. As such, the periodic stalls prevent the stores in groups of load and store instructions from issuing that cycle. Any pending load instructions are then able to be moved forward to join the load capacity of that data cache cycle. Furthermore, now that the store instruction has been stalled for one cycle, it is more likely to be paired with other store(s) by the issue queue in a subsequent cycle. This tends to cause the issue queue to issue load groups and store groups. During the issue of a store group, there are no load operations required. As such, the store queue is free to update the data cache with the data from previous store instructions.

In other words, the invention memory access member biases issuance of store instructions in a manner that prevents the store queue from becoming full, and hence enables the store queue to write to the data cache before the store queue becomes full.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

The drawings are not necessarily to scale, emphasis instead being placed upon illustrating the principles of the invention.

DETAILED DESCRIPTION OF THE PREFERRED EMBODIMENT

Figure 1:
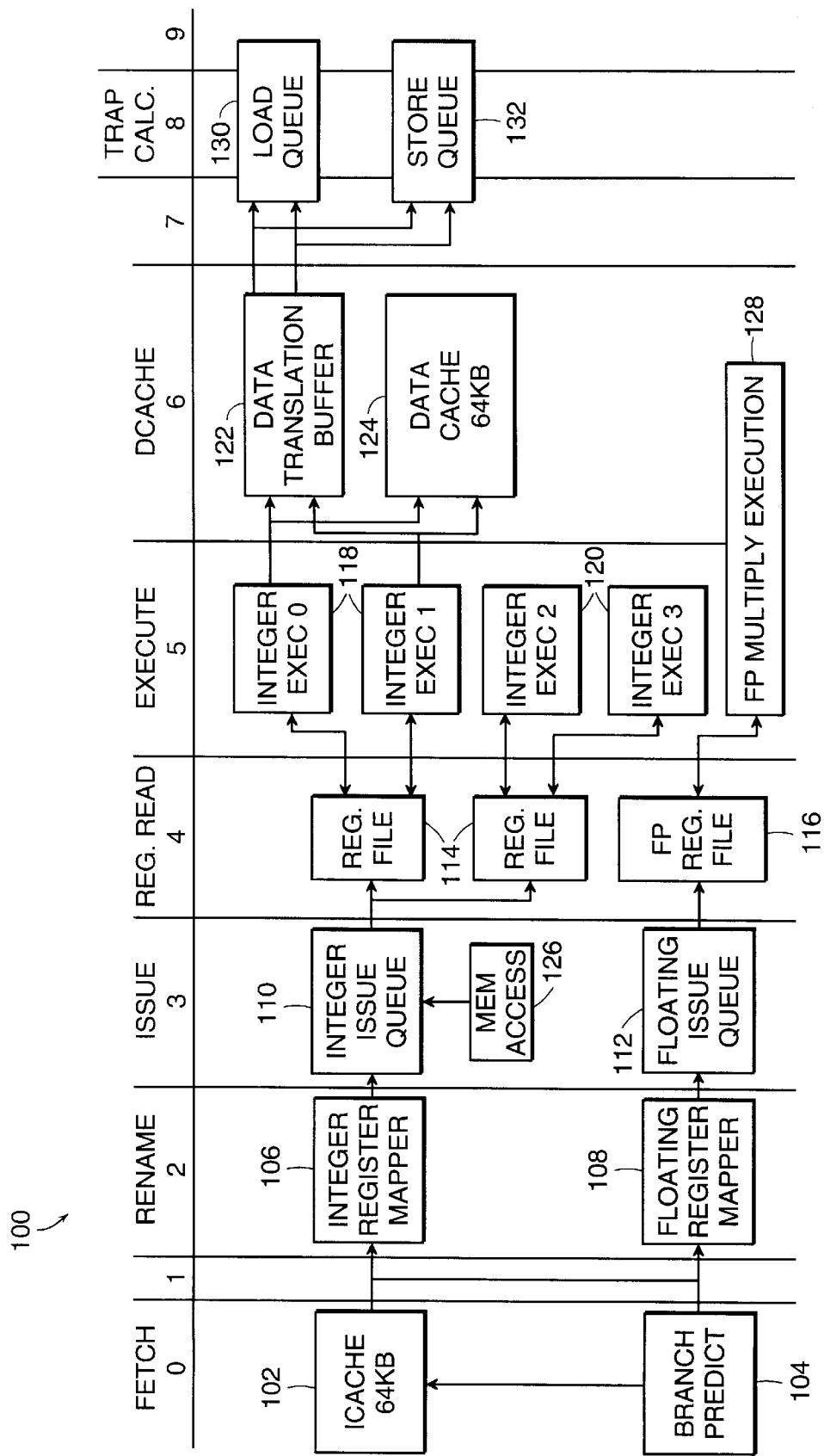
FIG. 1 is a block diagram of the instruction pipeline of a computer processor embodying the present invention.

FIG. 1 shows the various stages of a typical instruction pipeline 100 of a microprocessor 20 (FIG. 2) embodying the present invention. In Stage 0, the fetch stage, one or more instructions are fetched, typically from an instruction cache 102. The instruction cache 102 may employ results from a branch predict unit 104 which are passed onto Stage 1. In Stage 1, the instructions are slotted or decoded. Thus, Stage 1 is typically known as the slot stage. In Stage 2, the rename stage, virtual registers named in the instructions are renamed or mapped to physical registers by integer register mapper 106 and floating register mapper 108. Instruction identifiers are assigned to instructions during this stage.

In Stage 3, the issue stage, instructions are written into integer and floating point instruction queues 110 and 112, respectively. The instruction queue decides which instructions are to issue based on available resources (e.g., registers and execution units) and on register and memory dependencies, moving the issuing instructions to execution units 118, 120 and 128. The instructions remaining in the issue stage (i.e., instruction queues 110,112) are squashed down to remove empties. A memory access member 126 biases issuance of store instructions to prevent the store queue 132 (Stage 8) from becoming full as detailed below.

Next, in the register read stage (Stage 4), any registers are read as required by the issued instructions using integer register files 114 and floating point register file 116. In the execute stage (Stage 5), the instructions are executed by integer execution units 118, 120 and floating point execution unit 128. Any memory references which must be derived are calculated during this stage.

Stages 6 through 9 are memory stages. In Stage 6, the data cache stage, data is read from or written to a primary data cache 124 depending upon whether a load instruction or tore instruction is executing. Also in Stage 6, a data translation buffer 122 is accessed to translate virtual addresses to corresponding physical addresses. In Stage 7, the physical address is transported to a load queue 130 and a store queue 132 and written into one of those structures depending upon whether a load instruction or a store instruction, respectively, was executed. The store instruction is held in the store queue 132 awaiting retirement so that it can update the data cache 124 in Stage 9. In Stage 8, trap calculations are made and trap signals are transmitted to the instruction cache 102 accordingly. In Stage 9, instructions are retired or committed such that the data cache 124 is updated with data according to store instructions in store queue 132.

The primary data cache 124 is capable of performing two separate load operations per cycle but only one store update operation per cycle. Furthermore, store update operations may only take place if there are no load operations required in the current cycle.

It is not unusual for the issue stage queues 110, 112 to issue a store instruction and a load instruction simultaneously. The issue queue may well contain stores waiting for their incoming values in order to issue. These older instructions have issue priority. The computation may only deliver one (or less) stores per cycle. If there are dependency stalls in the computation, the issue logic may be looking ahead to find loads to issue. The recurring result is a store issued with a load.

In the prior art, if the issue stage queues 110, 112 continued to issue more load-store groups than cycles with no loads, there would be insufficient cycles to dump the stores. Eventually the store queue 132 would become full. The next store instruction to issue would generate a "FULL" trap which would disrupt the issuing of instructions enough for some store queue 132 entries to be dumped (i.e., written) to the data cache 124. In turn, this would disrupt the issue stage queue 110, 112 to a sufficient degree that performance is lost recovering from the trap.

Instead, the present invention provides a memory access member 126 in the issue stage, for ensuring the occasional issuance of a store-store instruction group. In turn, a dump of the store queue 132 is enabled preventing "Full" traps from being generated.

Figure 2:
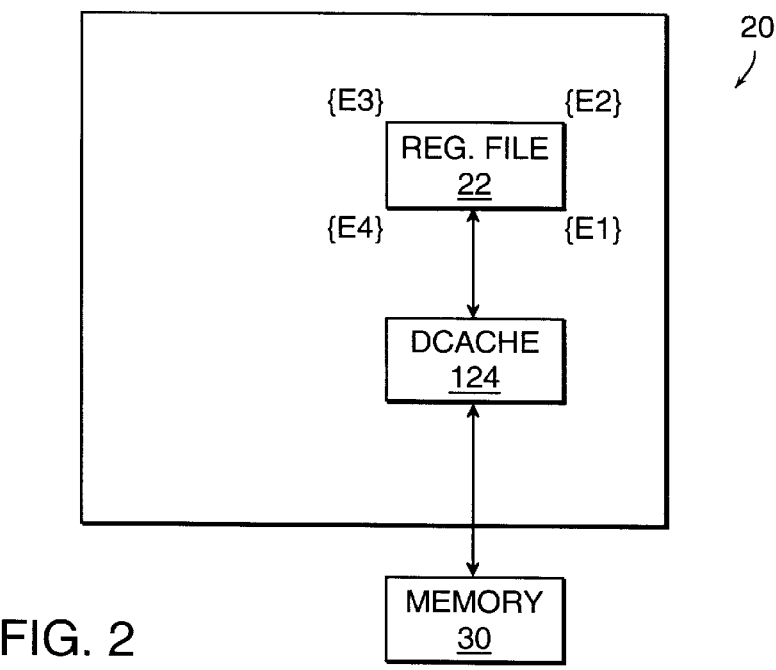
FIG. 2 is a schematic overview of the processor of FIG. 1.

Illustrated in FIG. 2 is an overview of the microprocessor 20 embodying the present invention. The microprocessor 20 has a register file 22 and a local storage (memory) area generally referred to as the primary data cache 124. The microprocessor 20 cooperates with a main memory 30 or off-chip cache of the overall computer system, to obtain data from and store data to the main memory or off-chip cache as follows.

An instruction or command is issued from the issue queue 110, 112 (FIG. 1) which causes one of the execution units 118, 120, 128 (FIG. 1) to respond. For simplicity and clarity in describing the invention, only four execution units are shown in FIG. 2 and are generally indicated as E1,E2,E3,E4. In a preferred embodiment, the lower two illustrated execution units E1,E4 handle/process load and store instructions. In accordance with a load instruction, an appropriate execution unit E1,E4 checks the local storage/data cache 124 for data required to process the issued load instruction. If the data is not in data cache 124, then the microprocessor 20 requests and obtains the data from main memory 30 or off-chip cache. The data is read from main memory 30 or off-chip cache into the local storage/data cache 124, and the execution unit E1,E4 reads the data from the data cache 124 into the register file 22.

In case of a store instruction, subject data in the store instruction is required to be written (or "dumped") to the data cache 124. Such a dump can only occur when there are no load instructions or other commands (e.g., fills) competing for access to the data cache 124. After issuance and before the "dump" stage, the store instruction resides in store queue 132 (FIG. 2). As store instructions are issued but the corresponding data is not written to the data cache 124, the store queue 132 eventually becomes full.

The microprocessor 20 is capable of issuing pairs of load and store instructions per cycle. It is common for a program to have stores from its computations in the issue queue before the computations are complete. It is also common for a program to complete less than one computation per cycle. The oldest members of the issue queue have priority. So, the stores tend to issue immediately in the cycle that they finally have their results, and may not be joined by other stores.

Meanwhile, the fetcher is working through the program, further ahead. The loads encountered are most often immediately issuable, unless there is nearby arithmetic involving pointers. The most common result is the issuance of a load-store pair.

The stores are placed into store queue 132. However, it is difficult for there to be enough load-free cycles to finish the dumping, or writing to data cache 124, of the stores. As a consequence, without the present invention memory access member 126, store instructions would fill the store queue 132 at a faster rate than dump cycles occur. Eventually the store queue 132 would become full and a "full" trap issued.

However, the present invention memory access member 126 biases the combination of instructions being issued in Stage 3 (FIG. 1) so that store-store combinations are periodically issued. In turn, the cycle in which the store-store combination of instructions is issued is absent of a load instruction. As such, the store instructions in the store queue 132 may be written to the data cache 124. This ultimately relieves the store queue 132 from becoming full and from setting the "full" trap.

Figure 3:
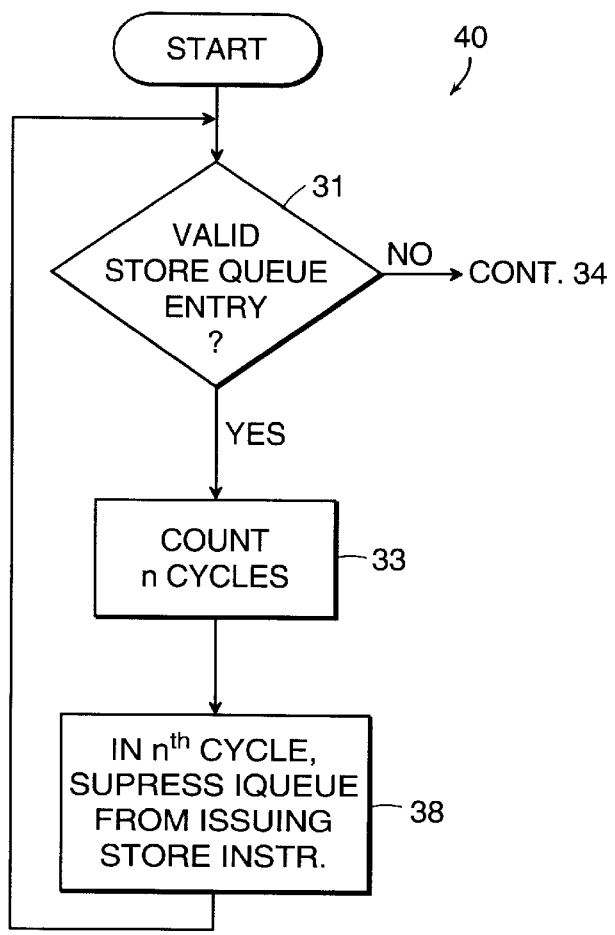
FIG. 3 is a flow diagram of the invention memory access member employed in the processor of FIG. 1.

In the preferred embodiment, the invention memory access member 126 performs the memory access routine 40 outlined in FIG. 3. In step 31 of the routine 40, the present invention determines if there is a valid store queue entry. A "valid" store queue entry is an issued store instruction residing in the store queue 132 waiting for a dump stage in which the store instruction can be written to the data cache 124 (i.e., where there are no load instructions or other commands blocking access to the data cache 124). If there is a valid store queue entry, then the present invention routine counts n cycles (step 33) and delays a store instruction from issuing during the nth cycle (step 38). This in turn increases the probability of and hence biases the succeeding cycle to issue a store- store instruction combination. Upon such a store-store combination being issued in that succeeding (i.e., n+1) cycle, then a dump from the store queue 132 to the data cache 124 is enabled and will occur.

Preferably n=3 such that routine 40, in every third cycle, delays a store instruction from issuing. It is understood that other values of n are also suitable.

If a valid store queue entry does not exist, then the invention routine 40 enables the memory system (Stage 3, FIG. 1) to issue store and load instructions as per usual, i.e., without biasing toward store-store combinations. This is illustrated at 34 in FIG. 3.

If there are off-chip loads or stores in progress, then the invention routine 40 enables the memory system (Stage 3, FIG. 1) to issue load and store instructions as per usual. The fills from off-chip references act in a similar manner by blocking data cache references for a cycle.

In an alternative embodiment, the invention routine includes in its determination of a valid store queue entry, whether or not the store instruction is committed (retired) and hence ready and waiting to be dumped (written to data cache 124). This definition of "valid" store queue entry takes into consideration speculative processors which issue instructions based on speculation.

While this invention has been particularly shown and described with references to preferred embodiments thereof, it will be understood by those skilled in the art that various changes in form and details may be made therein without departing from the spirit and scope of the invention as defined by the appended claims.

For example, the invention routine may also take into account the tendency of the store queue 132 in the past to become full. Based on recorded indications of such "history", historesis may be employed to determine whether the salient steps of the invention routine 40 (FIG. 3) are to be executed for the current cycle.

For example, the invention routine may also take into account the number of entries in the store queue. Only if the store queue has reached a threshold level of occupancy, are the salient steps of the invention routine 40 to be executed.

In another example, a delay after off-chip memory system quiescence may be inserted before the salient steps of the invention routine 40 are activated.

What is claimed is:

1. In a computer processor having (i) a data cache, and (ii) a store queue coupled to the data cache for holding issued store instructions prior to writing data from the store instructions to the data cache, processor apparatus comprising:

a source of load instructions and store instructions; and a memory access member responsive to the source for issuing load instructions and store instructions, the memory access member biasing issuance of store instructions in a manner that prevents the store queue from becoming full, by enabling the store queue to write to the data cache before the store queue becomes full.

2. Processor apparatus as claimed in claim 1 wherein the processor further enables the store queue to write to the data cache only in a cycle where load instructions are absent from accessing the data cache, and the processor issues groups of load and store instructions in any combination; and the memory access member biases issuance of store instructions such that groups of store instructions are periodically issued enabling the store queue to write to the data cache.

3. Processor apparatus as claimed in claim 2 wherein the memory access member biases groups of store instructions to be issued at least one time in every three cycles.

4. Processor apparatus as claimed in claim 2 wherein the memory access member further reduces the number of data cache cycles involving a load instruction.

5. Processor apparatus as claimed in claim 1 wherein the memory access member further reduces the number of data cache cycles involving a load instruction.

6. A computer processor comprising:

a data cache;

a store queue coupled to the data cache for holding issued store instructions prior to writing data from store instructions to the data cache, the processor enabling the store queue to write to the data cache in certain cycles;

a source of load instructions and store instructions; and a memory access member responsive to the source for issuing load instructions and store instructions, the memory access member reducing number of data cache cycles involving load instructions and hence enabling the store queue to write to the data cache before the store queue becomes full.

7. A computer processor as claimed in claim 6 wherein the processor further enables the store queue to write to the data cache only in a cycle where load instructions are absent from accessing the data cache, and the processor issues groups of load and store instructions in any combination; and the memory access member biases issuance of store instructions such that groups of store instructions are periodically issued enabling the store queue to write to the data cache.

8. A computer processor as claimed in claim 7 wherein the memory access member biases groups of store instructions to be issued at least one time in every three cycles.

9. A computer processor as claimed in claim 6 wherein the memory access member biases groups of store instructions to be issued at least one time in every three cycles.

10. In a computer processor having (i) a data cache, and (ii) a store queue coupled to the data cache for holding issued store instructions prior to writing data from the store instructions to the data cache, a method of balancing load instructions and store instructions access to the data cache, comprising the steps of:

providing a source of load instructions and store instructions;

enabling the store queue to write to the data cache in certain cycles;

issuing load instructions and store instructions from the source in a manner that biases issuance of store instructions such that the store queue is prevented from becoming full and enabled to write to the data cache before the store queue becomes full.

11. A method as claimed in claim 10 wherein:

the step of enabling the store queue to write to the data cache includes writing to the data cache only in a data cache cycle where load instructions are absent from accessing the data cache; and the step of issuing load instructions and store instructions includes reducing number of data cache cycles involving load instructions.

12. A method as claimed in claim 11 wherein the step of issuing further includes issuing groups of store instructions at least one time in every three data cache cycles.

13. A method as claimed in claim 10 wherein the step of issuing load instructions and store instructions includes periodically issuing groups of store instructions so as to enable the store queue to write to the data cache.

14. A method as claimed in claim 13 wherein the step of issuing further includes issuing groups of store instructions at least one time in every three data cache cycles.

15. A method as claimed in claim 10 wherein the step of issuing further includes issuing groups of store instructions at least one time in every three data cache cycles.

* * * * *